(12) United States Patent
Marcq et al.

(10) Patent No.: US 10,798,961 B2
(45) Date of Patent: Oct. 13, 2020

(54) FUNCTIONAL FOOD AND BEVERAGE COMPOSITIONS WITH IMPROVED TASTE THROUGH THE USE OF SENSATES

(71) Applicant: Altria Client Services Inc., Richmond, VA (US)

(72) Inventors: Pauline Marcq, Richmond, VA (US); Gerd Kobal, Sandy Hook, VA (US); Maria Gogova, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 371 days.

(21) Appl. No.: 14/207,104

(22) Filed: Mar. 12, 2014

(65) Prior Publication Data

US 2014/0271999 A1 Sep. 18, 2014

Related U.S. Application Data

(60) Provisional application No. 61/799,309, filed on Mar. 15, 2013.

(51) Int. Cl.
*A23L 27/00* (2016.01)
*A23L 2/52* (2006.01)

(52) U.S. Cl.
CPC ............... *A23L 27/86* (2016.08); *A23L 2/52* (2013.01); *A23L 27/88* (2016.08)

(58) Field of Classification Search
CPC .......... A23L 1/22; A23L 2/52; A23L 1/22091; A23L 1/22083
See application file for complete search history.

(56) References Cited

U.S. PATENT DOCUMENTS

| | | | | |
|---|---|---|---|---|
| 3,064,311 A | * | 11/1962 | Bain | B01J 2/24 264/144 |
| 6,165,516 A | * | 12/2000 | Gudas et al. | 426/3 |
| 7,371,841 B2 | * | 5/2008 | Julius | C07K 14/705 435/235.1 |
| 2006/0204551 A1 | * | 9/2006 | Manley et al. | 424/439 |
| 2011/0159141 A1 | * | 6/2011 | Luo | A23G 3/36 426/5 |

FOREIGN PATENT DOCUMENTS

| | | |
|---|---|---|
| FR | 2 923 990 | 5/2009 |
| WO | WO 2008/119196 | 10/2008 |
| WO | WO 2008/119197 | 10/2008 |
| WO | WO 2012/005349 | 1/2012 |

OTHER PUBLICATIONS

TFG: The Food Guru: http://foodguru802.blogspot.com/2012/02/energy-shots-are-they-healthy.html; published Feb. 10, 2012.*
Burton: published online Feb. 1, 2012, at: https://springsoralhealth.wordpress.com/2012/02/01/ph-of-soft-drinks/.*
Examine.com: published online at least by Jan. 5, 2012 at: http://web.archive.org/web/20120105005841/http://examine.com/supplements/Capsaicin/.*
CSPI: published online at least by Jan. 24, 1998 at: http://web.archive.org/web/19980124040618/http://www.cspinet.org/new/cafchart.htm.*
McKemy: TRP Ion Channel Function in Sensory Transduction and Cellular Signaling Cascades; Chapter 13TRPM8: The Cold and Menthol Receptor; Liedtke WB, Heller S, editors. Boca Raton (FL): CRC Press/Taylor & Francis; 2007.*
Sugana: JP 2002330735 A: Method for Carbonated Beverage Production; PUBN-Date: Nov. 19, 2002.*
International Search Report dated Jul. 7, 2014, issued in PCT/US2014/025720.
Microtek, *Encapsulated Caffeine & Vitamins*, http://www.microteklabs.com/encapsulated-caffein-and vitamins.html (Jan. 1, 2013; printed May 16, 2014).

* cited by examiner

*Primary Examiner* — Patricia A George
(74) *Attorney, Agent, or Firm* — Buchanan Ingersoll & Rooney PC

(57) ABSTRACT

The present application is directed to sensory technologies for beverages and other products that significantly reduce or fully mask bitterness and/or off-flavor associated with the presence of functional ingredients, such as caffeine or L-phenylalanine. In particular, reduction or masking of the bitterness and/or off-flavor in the beverage or food composition is achieved through the addition of trigeminal sensation-eliciting compounds, referred to herein as sensates, responsible for cooling, warming, tingling, or mouthfeel-type sensations.

20 Claims, No Drawings

FUNCTIONAL FOOD AND BEVERAGE COMPOSITIONS WITH IMPROVED TASTE THROUGH THE USE OF SENSATES

CROSS-REFERENCE TO RELATED APPLICATIONS

This application claims priority to U.S. Provisional Patent Application Ser. No. 61/799,309, filed on Mar. 15, 2013, which is incorporated herein by reference in its entirety for all purposes.

BACKGROUND

Caffeine and other additives are commonly added to soft drinks, energy drinks or shots, and some foods to provide a burst of energy to the consumer. In particular, energy drinks or shots having high caffeine content are very popular. However, because of the bitter taste of caffeine, the high caffeine content of such energy drinks or shots and functional foods can be unappealing to consumers.

As such, there is an unmet need in the field for modified energy drinks or shots, and functional foods in which the bitter taste or off-flavors produced by the addition of caffeine or other additives is reduced, neutralized, or overcome.

SUMMARY

Provided are compositions, such as food and beverages, for human consumption comprising a predetermined quantity of a base composition; caffeine in an amount of about 20 mg to about 16 g; and one or more sensates, wherein the one or more sensates comprise up to about 5% by weight based on the weight of the composition. The sensates may be menthol and its stereoisomers, menthone glycerol ketal, (−)-menthyl lactate, 3-(1-menthoxy)propane-1,2-diol, WS-3, WS-5, capsaicin, camphor, cinnamaldehyde, $CO_2$, red pepper extract, Szechuan pepper extract, and combinations thereof. The sensates may also be one or more compounds capable of stimulating one or more TRP ion channels located on trigeminal nerve endings. Such TRP channels include the TRPM8, TRPV1, and TRPA1 channels. The compositions may also include flavorants, viscosity increasing agents, vitamins, minerals, nutraceuticals, colorants, preservatives, pH adjusting agents, and combination thereof.

Also provided are compositions for human consumption comprising a beverage or food product; a functional ingredient, such as taurine, glucoronolactone, caffeine, B vitamins, guarana, ginseng, *Ginkgo biloba*, L-carnitine, sugars, antioxidants, yerba maté, creatine, and milk thistle; and one or more sensates, wherein the one or more sensates is an activator of at least one of the TRP channels selected from the group consisting of the TRPV1, TRPA1, and TRPM8 channels.

DETAILED DESCRIPTION

Energy drinks or shots and food products containing a relatively high level of caffeine are very popular. In particular, functional beverages, such as energy shots or drinks, usually contain high levels of functional ingredients, such as caffeine, L-phenylalanine, taurine, or L-carnitine, to provide a desired physiological effect. Desired effects may include energy boosting or memory enhancement. Such drinks or shots and foods also contain vitamins, amino acids, herbal extracts, choline derivatives, and other ingredients, which are believed to energize the consumer of the drinks or shots or foods.

Caffeine, also known as 1,3,7-trimethyl xanthine, is a white, odorless, bitter-tasting substance. Caffeine occurs naturally in tea, coffee, and chocolate, and is commonly added to soft drinks, energy drinks, and some foods. However, because of the bitter taste of caffeine, the flavor of drinks or foods having a relatively high caffeine content can be unappealing. Vitamins, amino acids, and other additives similarly affect the flavor profile of functional beverages and foods. To overcome the bitterness, large amounts of sweeteners, acids, and flavors are often added to energy drinks and foods. Despite the addition of such ingredients, the energy foods and drinks typically still have an unpleasant or bitter taste.

Assessing the flavor profile of individual functional ingredients and their mixtures is an important part of a beverage formulation as it allows identifying potential sources of off-flavors. Functional beverages, as described herein, include drinks and shots. To create superior flavor profiles in functional beverages and food products, technologies that reduce or mask the sensory deficits need to be implemented. Herein provided are sensory technologies that mask undesirable flavors. More specifically, provided are sensory technologies that reduce, modify, or eliminate the bitter flavor or off-note flavors associated with functional ingredients through the presence of trigeminal sensation eliciting compounds/ingredients, referred to herein as sensates. In one embodiment, one or more sensates are added to a functional beverage or food in place of sweeteners or acids commonly used to mask bitterness through sweet and sour sensations.

Distinct from taste and aroma, the trigeminal sensory system is an important sensory modality involved in flavor perception. Trigeminal sensations can be induced by chemicals, temperature, and pressure through stimulation of trigeminal nerve endings, e.g., in the nose and the mouth. The best-characterized examples of chemically-induced trigeminal sensation, also termed chemesthesis, are the pungency, warming, or burning sensations produced by chili pepper or ethanol; the cooling produced by menthol; and the tingling and prickling sensations produced by carbonation. These sensations can also be described as mouthcoating or mouthfeeling.

As such, functional compositions for human consumption such as energy drinks and food products include sensates to improve taste are provided herein. In one embodiment, the compositions for human consumption include relatively high amounts of caffeine without the bitter taste normally associated therewith. Such compositions for human consumption not having a bitter taste are formed by the addition of one or more sensates as opposed to caffeine alone, which is commonly used to form energy drinks or foods.

The bitterness masking effect is achieved by activating trigeminal nerve endings with sensates which, either alone or in combinations, are incorporated into a beverage or food product containing functional ingredients. The sensate composition may be utilized to (1) significantly decrease or mask the bitterness and/or other off-notes of the product associated with the use of functional ingredients and/or (2) provide an acceptable organoleptic characteristic of the final product. Functional ingredients appropriate for use in the present application include taurine, glucoronolactone, B vitamins, guarana, ginseng, *Ginkgo biloba*, L-carnitine and its derivatives, sugars, antioxidants, yerba maté, creatine, citicoline, choline derivatives, sinephrine, inistol, theobromine, naringin, quercetin, amino acids, plant extract, and milk thistle.

Functional ingredients of particular interest are caffeine and bitter-tasting plant extracts. Functional ingredients may also include products that promote weight loss, for example epigallocatechin gallate and chlorogenic acids.

Sensates disclosed herein may be used individually or combinations. Appropriate sensates for use include compounds that stimulate members of the transient receptor protein channel (TRP) family of ion channels located on the trigeminal nerve endings. TRP channels form a group of ion channels located mostly on the plasma membrane of cells. TRP channels mediate a variety of sensations, including pain, hotness, warmth, coldness, various tastes, pressure, and vision. Some TRP channels are activated by molecules found in spices like garlic (allicin), chili pepper (capsaicin), and wasabi (allyl isothiocyanate), while others are activated by menthol, camphor, peppermint, and cooling agents. TRP channel proteins are grouped into six subfamilies on the basis of amino acid sequence homology, each family having selected functional properties and select agonists. For example, the TRPV1 channel, known as the capsaicin receptor or vanilloid receptor 1, is activated by capsaicin, resiniferatoxin, heat, $H^+$, endocannabinoid lipids, and 2-APB. The TRPM8 channel has been described as a cold- and menthol-activated nonselective cation channel. It is thought to function as a cold thermosensor in sensory neurons. The TRPA1 channel has several agonists, including the active constituents of mustard oil (allyl isothiocyanate) and garlic (allicin).

In one embodiment, compounds that stimulate the TRPM8, TRPV1, and/or TRPA1 channels are used as sensates. Chemical compounds capable of stimulating the TRPM8 channel include menthol and its stereoisomers, menthol-related cooling agents (e.g., menthone glycerol ketal, (−)-menthyl lactate, 3-(1-menthoxy)propane-1,2-diol), and carboxamide cooling agents (e.g., WS-3 (N-Ethyl-p-menthane-3-carboxamide, WS-5-[Ethyl 3-(p-menthane-3-carboxamido)acetate]). Chemical compounds capable of stimulating the TRPV1 and TRPA1 channels include capsaicin, camphor, cinnamaldehyde, and $CO_2$. Other compounds and complex mixtures that can be used as sensates include cremophor, red pepper extract, Szechuan pepper extract, natural or artificial cooling or warming flavors, as well as other compounds and complex mixtures capable of eliciting trigeminal sensations. Not wishing to be bound by any particular theory, it is believed that the inclusion of sensates, such as capsaicin, in the composition for human consumption provides a hot taste which can mask the bitterness of caffeine and/or off-flavors of other ingredients.

In one embodiment, the compositions for human consumption have a relatively high caffeine content so as to provide a consumer with a burst of energy. Moreover, the compositions for human consumption contain about 20 mg of caffeine to about 16 g of caffeine (e.g., about 20 mg to about 200 mg, about 200 mg to about 400 mg, about 50 mg to about 1.5 g, up to about 1 g, and about 1 g to about 16 g) so as to provide a burst of energy to the consumer. The concentration of caffeine may also be determined by a percent weight of the composition. For example, caffeine may be present in concentration that is about 0.025% to about 2.5% by weight of the composition. It is contemplated that the energy drinks and foods described herein may contain pure or modified caffeine. In one embodiment, the energy drinks and food described herein contain an encapsulated form of caffeine. Encapsulated caffeine may be formed as a caffeine complex including caffeine and an organic acid in about a 1:1 molar ratio. Preferably, the composition provides a single serving of a food or drink product. A single serving of food can have a weight of about 5 g to about 450 g. Beverage serving sizes may vary. For example, a single serving of drink is about 200 mL to about 600 mL. In another embodiment a single serving of a drink is about 30 mL to about 60 mL. In another embodiment, a single serving of a drink is about 5 mL to about 30 mL.

As used herein, the term "base composition" refers to at least a portion of foods and liquids to which the sensate or combinations thereof can be added.

Suitable liquids or beverages include, without limitation, water, fruit juices, vegetable juices, and combinations thereof. The liquids can include any suitable drinkable liquids, which can be carbonated or still. Preferably, the liquid is non-alcoholic and can contain additives such as flavors, colors, and other additives as described herein.

Preferably, the sensate is dispersed throughout a liquid to form an energy drink. Preferably, the composition for human consumption includes sensates in an amount sufficient to mask the bitter taste of caffeine. For example, the composition for human consumption can include sensates in an amount of about 0.1% to about 5% by weight based on the weight of the composition for human consumption.

Compositions disclosed herein can be used to reduce or mask bitterness and/or off-flavor in a product that is not a beverage, e.g., a food product. In addition, such compositions can be used to create a differentiating sensory experience in a product format that is not a beverage. Suitable foods include, without limitation, any solid or liquid food product to which the sensate can be incorporated. The foods can be breakfast foods such as bagels, muffins, pancakes, pastries, doughnuts, dairy products, cereals, biscuits and the like, snacks such as granola bars, protein bars, cookies, chips, ice cream, popcorn and any other suitable snack, and/or other types of foods such as soups, sandwiches, vegetables, fruits, meats, dairy products, and the like which can be consumed to provide a burst of energy.

Preferably, the food product is an energy product that is combined with one or more sensates. The one or more sensates can be dispersed in a coating, such as an icing, dispersed in a filling material or the one or more sensates can be dispersed throughout the entire food product.

Compositions disclosed herein can also be used to reduce or mask bitterness of functional ingredients that are not associated with energy.

In one embodiment, the compositions for human consumption may also include additives. Suitable additives for inclusion the in the compositions for human consumption include, without limitation, flavorants, vitamins, minerals, nutraceuticals, additional energizing agents, soothing agents, coloring agents, amino acids, antioxidants, preservatives, acidity regulators, viscosity adjusting agents, and/or combinations thereof.

As used herein, the term "nutraceuticals" refers to any ingredient in foods that has a beneficial effect on human health. Nutraceuticals include particular compounds and/or compositions isolated from natural food sources and genetically modified food sources.

Optionally, the compositions for human consumption can include flavorants. Suitable flavorants include any flavorants commonly used in food and/or drinks. Exemplary flavorants include, but are not limited to, berry flavors such as pomegranate, acai, raspberry, blueberry, strawberry, boysenberry, and/or cranberry. Other suitable flavorants include, without limitation, any natural or synthetic flavor or aroma, such as peppermint, spearmint, wintergreen, chocolate, licorice, citrus and fruit flavors, such as apple, peach, pear, cherry, plum, orange, lime, grape, mango, passion fruit, acai, pomegranate, pineapple, and grapefruit, gamma octalactone, vanillin, ethyl vanillin, butter, rum, coconut, almond, pecan, walnut, hazelnut, French vanilla, macadamia, sugar cane, maple, cassis, caramel, banana, malt, espresso, white chocolate, spice flavors such as cinnamon, clove, cilantro, basil, oregano, garlic, mustard, nutmeg, rosemary, thyme, tarragon, dill, sage, anise, and fennel, methyl salicylate, linalool, jasmine, coffee, olive oil, sesame oil, sunflower oil, bergamot oil, geranium oil, peanut oil, lemon oil, ginger oil, balsamic vinegar, rice wine vinegar and red wine vinegar. Other suitable flavors include vegetable flavors, such as tomato, carrot, spinach, broccoli, squash, onion, beet, turnip, parsnip, asparagus, pepper, leeks, rutabaga, fennel, zucchini, potato, and combinations thereof.

Preferably, the flavorants are added to the composition for human consumption in an amount of about 0.1% to about 50% by weight based on the weight of the composition for human consumption (e.g., about 1% to about 45%, about 2% to about 40%, about 5% to about 35%, about 10% to about 30%, or 15% to about 20%). The amount of flavorant added can depend on the flavorant used as some flavorants are more potent than others and therefore can provide adequate flavoring in smaller amounts.

Preferably, the flavorants are added in the form of essential oils, encapsulated flavorants, coacervated flavorants, colloidal encapsulated flavorants, suspensions, and/or solutions. Alternatively, the flavorants can be added as dried powders, particles, and/or pieces.

In an embodiment, a composition for human consumption creates a unique flavor profile. That is, to create a differentiating sensory experience within the function beverage category by adding cooling sensations, warming sensations, or both. Optionally, soothing agents can be added to the composition for human consumption to provide a soothing sensation to the throat and oral cavity. Suitable soothing agents include, without limitation, chamomile, lavender, jasmine, and the like. The soothing agents can be included in an amount of about 0.1% to about 5% by weight based on the weight of the composition for human consumption.

Optionally, the composition for human consumption may also include additional energizing ingredients in addition to the caffeine complex. Suitable energizing ingredients include, without limitation, taurine, citicoline, and guarana. The energizing ingredients can be included in an amount of about 0.1% to about 5% by weight based on the weight of the composition for human consumption.

Optionally, the composition for human consumption may also include supplemental amounts of vitamins in addition to any present due to the inclusion of fruits and/or vegetables in the composition for human consumption. Suitable vitamins include, without limitation, vitamin A (retinol), vitamin D (cholecalciferol), vitamin E group, vitamin K group (phylloquinones and menaquinones), thiamine (vitamin B1), riboflavin (vitamin B2), niacin, niacinamide, pyridoxine (vitamin B6 group), folic acid, choline, inositol, vitamin B12 (cobalamins), PABA (para-aminobenzoic acid), biotin, vitamin C (ascorbic acid), and mixtures thereof. The amount of vitamins incorporated into the composition for human consumption can be varied according to the type of vitamin and the nature of the product, i.e., food, beverage or energy shot. For example, the amount of vitamins may be chosen so as to provide an amount less than or equal to the recommendations of the United States Department of Agriculture Recommended Daily Allowances.

Optionally, the composition for human consumption may include nutraceuticals. Suitable nutraceuticals include, without limitation, various phytonutrients derived from natural plants and genetically engineered plants. The nutraceuticals can be included in an amount of about 0.1% to about 5% by weight based on the weight of the composition for human consumption.

Optionally, the composition for human consumption may include a supplemental amount of minerals in addition to any included due to the inclusion of fruits and/or vegetables. Suitable minerals include, without limitation, calcium, magnesium, phosphorus, iron, zinc, iodine, selenium, potassium, copper, manganese, molybdenum, chromium, and mixtures thereof. The amount of minerals incorporated into the composition for human consumption can be varied according to the type of mineral and the nature of the product, i.e., food, beverage or energy shot. For example, the amount of minerals can be formulated to include an amount less than or equal to the recommendations of the United States Department of Agriculture Recommended Daily Allowances.

Optionally, amino acids can also be included in the composition for human consumption. Suitable amino acids include, without limitation, the eight essential amino acids that cannot be biosynthetically produced in humans, including valine, leucine, isoleucine, lysine, threonine, tryptophan, methionine, and phenylalanine. Examples of suitable amino acids include the non-essential amino acids including alanine, arginine, asparagine, aspartic acid, cysteine, glutamic acid, glutamine, glycine, histidine, proline, serine, and tyrosine. The amino acids can be included in an amount of about 0.1% to about 5% by weight based on the weight of the composition for human consumption.

Optionally, the composition for human consumption may include various active agents having antioxidant properties that can delay the aging process. For example, the active ingredients that can be extracted from *Ginkgo biloba* include flavonoid glycosides ("ginkgoflavonoids"), such as (iso) quercetin, kaempferol, kaempferol-3-rhamnosides, isorhamnetin, luteolin, luteolin glycosides, sitosterol glycosides, and hexacyclic terpene lactones, referred to as "ginkgolides" or "bilobalides." The active ingredients that can be extracted from *Camellia sinensis*, such as green tea, include various "tea tannins," such as epicatechol, epigallocatechol, epigallocatechol gallate, epigallocatechol gallate, theaflavin, theaflavin monogallate A or B, and theaflavin digallate. The active ingredients that can be extracted from *Vaccinium myrtillus*, such as blueberry, include at least 15 different anthocyanosides, such as delphinidin, anthocyanosides, myrtin, epimyrtin, phenolic acids, glycosides, quercetin, isoquercetin, and hyperoside. The active ingredients that can be extracted from *Vinis vitifera*, such as grapes, include polyphenols, catechols, quercetin, and resveratrols. The active ingredients that can be extracted from *Olea europensis*, such as the leaves of olive trees, include oleuropein. Many active ingredients identified from these and other plant sources associated with the neutralization of free radicals and useful for delaying the ageing process are contemplated. The active ingredients of *Trifolium pratense*, such as purple clovers (i.e., common purple trefoils), include isoflavones or isoflavone glucosides, daidzein, genestein, formononentin, biochanin A, ononin, and sissostrin. The health-promoting properties of compounds derived from *Panax*, a genus that includes Ginseng, are well-established. These and other botanicals, botanical extracts, and bioactive compounds are contemplated.

Optionally, the composition for human consumption may also include preservatives to increase the shelf-life of the drink or food and/or prevent growth of bacteria, molds, fungus, and/or yeast. Moreover, the addition of preservatives may help maintain the color, flavor and/or texture of the composition for human consumption. Suitable preservatives for inclusion in the composition for human consumption include, without limitation, methyl paraben, propyl paraben, sodium propionate, citric acid, ascorbic acids, such as Vitamin C, sorbic acid alkali metal salts, such as potassium sorbate, benzoic acid alkali metal salts, such as sodium benzoate, and the like. The preservatives can be included in an amount sufficient to preserve the composition for human consumption and/or extend the shelf-life of the composition for human consumption to at least about 4 weeks or more. For example, the preservative can be included in the composition for human consumption in an amount of about 0.01% to about 1.0% by weight based on the weight of the composition for human consumption.

Optionally, the composition for human consumption, in particular an energy food or drink, includes at least one acidity regulator to maintain the pH of the energy drink or food below about 5, more preferably below about a pH of 4. Suitable acidity regulators for inclusion in the energy drinks or foods include, without limitation, ammonium hydroxide, potassium, carbonate, sodium bicarbonate, sodium carbonate, potassium carbonate, calcium carbonate and combinations thereof. The at least one acidity regulator can be added in an amount sufficient to adjust the food or drink to a pH ranging from about 2 to about 5.

Not wishing to be bound by any particular theory, it is believed that maintaining the pH of the energy drink or food at about 2 to about 5, preferably about 3.5 to about 4.5 minimizes the bitter flavor provided by caffeine and other additives. Thus, the addition of an acidity regulator can help maintain the pH of the energy drink within a range that complements the activity of one or more sensates.

Optionally, energy drinks or foods, such as soups, formed as described herein can include at least one viscosity increasing agent. Preferably, the at least one viscosity increasing agent is selected from the group consisting of pectin, alginate, starch, hydroxypropyl methyl cellulose, guar gum, and combinations thereof. Also preferably, the at least one viscosity increasing agent is included in an amount ranging from about 0.5% by weight based on the weight of the composition for human consumption to about 5% by weight based on the weight of the composition for human consumption.

For example, an energy drink may be formed by adding one or more sensates and an encapsulated form of caffeine to water. A viscosity increasing agent, such as alginate, can be then be added to the beverage to aid in keeping the encapsulated caffeine suspended in the liquid base composition. Thus, delivery of the encapsulated caffeine is substantially consistent when the energy drink is consumed because the encapsulated caffeine is substantially evenly dispersed throughout the energy drink.

Optionally, at least one coloring agent may be added to the composition for human consumption in an amount effective to produce a desired color. The coloring agent can be selected from any pigment, natural food color or dyes suitable for human consumption. Preferably, the coloring agents are water-soluble coloring agents.

The composition for human consumption can be formed in any suitable manner. In one embodiment, one or more sensates are dispersed in the base composition by mixing the one or more sensates and base composition, dispersing the one or more sensates in the base composition, and in the case of energy foods, applying the one or more sensates to a surface of the food. For example, the one or more sensates can be applied as a coating to a food. Alternatively, the base composition may be mixed with the one or more sensates such that the one or more sensates are dispersed substantially throughout the composition for human consumption.

The following examples are exemplary and are not meant to limit the embodiments disclosed herein.

EXAMPLES

Example 1

About 60 mL of water is mixed with 135 mg of active caffeine and one or more sensates present in an amount equal to about 5% by weight of the mixture to form an energy drink. The resulting energy drink is less bitter than an energy drink containing 60 mL water and 135 mg of pure caffeine.

Example 2

About 60 mL of water is mixed with 135 mg of active caffeine and one or more sensates present in an amount equal to about 2.5% by weight of the mixture to form an energy drink. The resulting energy drink is less bitter than an energy drink containing 60 mL water and 135 mg of pure caffeine.

Example 3

About 60 mL of water is mixed with 135 mg of active caffeine and one or more sensates present in an amount equal to about 1.0% by weight of the mixture to form an energy drink. The resulting energy drink is less bitter than an energy drink containing 60 mL water and 135 mg of pure caffeine.

Example 4

About 60 mL of water is mixed with 135 mg of active caffeine and one or more sensates present in an amount equal to about 0.5% by weight of the mixture to form an energy drink. The resulting energy drink is less bitter than an energy drink containing 60 mL water and 135 mg of pure caffeine.

Example 5

About 60 mL of water is mixed with 135 mg of active caffeine and one or more sensates present in an amount equal to about 0.1% by weight of the mixture to form an energy drink. The resulting energy drink is less bitter than an energy drink containing 60 mL water and 135 mg of pure caffeine.

Example 6

About 60 mL of water is mixed with L-phenylalanine in an amount of about 5% by weight and one or more sensates present in an amount equal to about 1.0% by weight of the mixture to form an energy drink. The resulting energy drink is less bitter than an energy drink containing 60 mL water and 135 mg of pure caffeine.

In this specification, the word "about" is often used in connection with numerical values to indicate that mathematical precision of such values is not intended. Accordingly, it is intended that where "about" is used with a numerical value, a tolerance of ±10% is contemplated for that numerical value.

While the foregoing describes in detail an energy drink or food including one or more sensates and methods for forming a composition for human consumption including one or more sensates with reference to a specific embodiment thereof, it will be apparent to one skilled in the art that various changes and modifications and equivalents to composition for human consumption and method may be employed, which do not materially depart from the spirit and scope of the invention.

What is claimed is:

1. A composition for human consumption comprising:
   a predetermined quantity of a base composition;
   caffeine in an amount of about 20 mg to about 200 mg; and
   one or more sensates,
   wherein the one or more sensates comprise about 0.1 to about 5% by weight based on the weight of the composition, and are effective in reducing the bitterness of the caffeine, wherein the one or more sensates is selected from the list consisting of menthol and its stereoisomers, menthone glycerol ketal, (−)-menthyl lactate, 3-(1-menthoxy)propane-1,2-diol, and peppermint, and
   wherein said composition does not include carboxamide cooling agents.

2. The composition for human consumption of claim 1, wherein the one or more sensates comprises one or more compounds capable of stimulating one or more TRP channels located on trigeminal nerve endings.

3. The composition for human consumption of claim 2, wherein the one or more sensates comprises one or more compounds capable of activating at least a TRPM8 channel.

4. The composition for human consumption of claim 1, wherein the base composition has a pH of about 2 to about 5.

5. The composition for human consumption of claim 1, wherein the base composition comprises a beverage.

6. The composition for human consumption of claim 5, wherein the beverage is selected from the group consisting of water, vegetable juice, fruit juice and combinations thereof.

7. The composition for human consumption of claim 1, further including at least one additive selected from the group consisting of at least one flavorant, at least one viscosity increasing agent, at least one vitamin, at least one mineral, at least one nutraceutical, at least one colorant, at least one preservative, at least one pH adjusting agent, or combination thereof.

8. The composition for human consumption of claim 7, wherein the at least one flavorant is included in the composition in an amount ranging from about 0.5% by weight based on the weight of the composition to about 25% by weight based on the weight of the composition.

9. The composition for human consumption of claim 7, wherein the at least one pH adjusting agent is added to the composition in an amount sufficient to adjust and/or maintain the pH of the composition to a pH of about 2 to about 5.

10. The composition for human consumption claim 7, wherein the at least one viscosity increasing agent is selected from the group consisting of pectin, alginate, starch, hydroxypropyl methyl cellulose, guar gum and combinations thereof and wherein the at least one viscosity increasing agent is included in the composition in an amount ranging from about 0.5% by weight based on the weight of the composition to about 5% by weight based on the weight of the composition.

11. The composition for human consumption of claim 1, wherein the composition is substantially free of any artificial sweeteners.

12. The composition for human consumption of claim 5, wherein the beverage is a carbonated liquid.

13. The composition for human consumption of claim 1, wherein the base composition is a food.

14. The composition for human consumption of claim 1, wherein the caffeine is an encapsulated caffeine complex including caffeine and an organic acid in about a 1:1 molar ratio, wherein the organic acid is selected from the group consisting of oxalic acid, malonic acid, maleic acid, succinic acid, glutaric acid, glutamic acid, adipic acid, caffeic acid and combinations thereof, and wherein the encapsulated caffeine releases about 100 mg to about 150 mg of caffeine when consumed.

15. A composition for human consumption comprising:
   a beverage or food product;
   a functional ingredient selected from the group consisting of taurine, glucoronolactone, caffeine B vitamins, guarana, ginseng, Ginkgo biloba, L-carnitine, antioxidants, yerba maté, creatine, and milk thistle; and one or more sensates,
   wherein the one or more sensates is selected from the list consisting of menthol and its stereoisomers, menthone glycerol ketal, (−)-menthyl lactate, 3-(1-menthoxy)propane-1,2-diol, and peppermint,
   wherein said composition does not include carboxamide cooling agents, and
   wherein the one or more sensates is an activator of at least a TRPM8 channel.

16. The composition for human consumption of claim 15, wherein the composition is a functional energy shot, wherein a volume of the energy shot is between about 5 mL and about 60 mL.

17. The composition for human consumption of claim 15, wherein the composition is a food product selected from the group consisting of bagels, muffins, pancakes, pastries, doughnuts, dairy products, cereals, biscuits, granola bars, protein bars, cookies, chips, ice cream, popcorn, and soups.

18. The composition for human consumption of claim 15, wherein the functional ingredient is caffeine and wherein the caffeine is encapsulated.

19. A composition for human consumption comprising:
   a beverage or food product;
   a functional ingredient, wherein the functional ingredient is an herb or amino acid; and
   one or more sensates,
   wherein the one or more sensates comprise about 0.1 to about 5% by weight based on the weight of the composition, wherein the one or more sensates is selected from the list consisting of menthol and its stereoisomers, menthone glycerol ketal, (−)-menthyl lactate, 3-(1-menthoxy)propane-1,2-diol, and peppermint, and
   wherein said composition does not include carboxamide cooling agents.

20. The composition for human consumption of claim 19, further including at least one additive selected from the group consisting of at least one flavorant, at least one viscosity increasing agent, at least one nutraceutical, at least one colorant, at least one preservative, at least one pH adjusting agent, or combination thereof.

* * * * *